(12) United States Patent
Jenwatanavet et al.

(10) Patent No.: US 9,250,613 B2
(45) Date of Patent: Feb. 2, 2016

(54) USER CONTROL INTERFACE BUTTON FLEX ANTENNA SYSTEM

(71) Applicant: QUALCOMM Incorporated, San Diego, CA (US)

(72) Inventors: Jatupum Jenwatanavet, San Diego, CA (US); Allen M. Tran, San Diego, CA (US); Joe Chieu Le, Poway, CA (US); Lauren Kwankit Leung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 13/831,699

(22) Filed: Mar. 15, 2013

(65) Prior Publication Data

US 2014/0269217 A1  Sep. 18, 2014

(51) Int. Cl.

| | |
|---|---|
| *H01Q 1/12* | (2006.01) |
| *G04R 60/10* | (2013.01) |
| *H01Q 9/42* | (2006.01) |
| *H01Q 1/27* | (2006.01) |
| *H01Q 1/38* | (2006.01) |
| *H04B 1/3827* | (2015.01) |

(52) U.S. Cl.
CPC .................. *G04R 60/10* (2013.01); *H01Q 9/42* (2013.01); *H01Q 1/273* (2013.01); *H01Q 1/38* (2013.01); *H04B 1/385* (2013.01)

(58) Field of Classification Search
CPC ........... H01Q 1/273; H01Q 1/24; G04R 60/10
USPC ................. 343/718, 702; 368/10, 47
See application file for complete search history.

(56) References Cited

U.S. PATENT DOCUMENTS 5,696,518 A * 12/1997 Itoh et al. ...................... 343/718
6,545,642 B1   4/2003 Doub et al.

(Continued)

FOREIGN PATENT DOCUMENTS

| CH | 673748 A | 4/1990 |
|---|---|---|
| EP | 1318437 A1 | 6/2003 |

(Continued)

OTHER PUBLICATIONS

International Search Report and Written Opinion—PCT/US2014/028829—ISA/EPO—Jul. 16, 2014.

*Primary Examiner* — Hoang V Nguyen
(74) *Attorney, Agent, or Firm* — The Marbury Law Group, PLLC

(57) ABSTRACT

A compact antenna system that provides an antenna capable of transmitting and/or receiving radio signals configured on a flexible substrate material supporting user control interface buttons. In an embodiment, an antenna may be formed on a user control interface button flex between the wire traces used to couple the user control interface buttons to a printed circuit board. In order to prevent the interference on the antenna that may be caused when current passes through the wire traces coupling the user control interface buttons to the printed circuit board, an RF choke (i.e., LC filter) circuit and bypass capacitors may be configured along each wire trace. In another embodiment, the wire trace coupling a user control interface button to the printed circuit board may be configured to serve the dual purposes of coupling the user control interface button to the printed circuit board; and functioning as an antenna capable of transmitting and/or receiving wireless radio signals.

40 Claims, 8 Drawing Sheets

(56) References Cited

U.S. PATENT DOCUMENTS

| | | |
|---|---|---|
| 7,280,438 B2 | 10/2007 | Fujisawa |
| 7,639,187 B2 * | 12/2009 | Caballero et al. ............. 343/702 |
| 8,040,287 B2 * | 10/2011 | Kimura ........................ 343/787 |
| 8,917,192 B2 * | 12/2014 | Choi ............................... 341/22 |
| 2008/0074329 A1 | 3/2008 | Caballero et al. |
| 2008/0166004 A1 | 7/2008 | Sanford et al. |
| 2010/0188307 A1 * | 7/2010 | Murata et al. ................ 343/788 |
| 2011/0012793 A1 | 1/2011 | Amm et al. |
| 2012/0081240 A1 | 4/2012 | Choi |
| 2012/0122519 A1 | 5/2012 | Jochheim |
| 2012/0134243 A1 * | 5/2012 | Sonoda ........................ 368/205 |

FOREIGN PATENT DOCUMENTS

| | | |
|---|---|---|
| JP | H0818317 A | 1/1996 |
| KR | 100785355 B1 | 12/2007 |

* cited by examiner

USER CONTROL INTERFACE BUTTON FLEX ANTENNA SYSTEM

FIELD

The embodiments of the present disclosure relate to an antenna system for an electronic device, and more particularly to an antenna formed on a flexible substrate supporting user control interface buttons that provide a user interface of the wristwatch device.

BACKGROUND

Mobile computing devices have seen explosive growth over the past few years. With growing computational power and memory capacity, personal computing devices have become essential tools of modern life, providing telephone and text communications, navigation, photo, and video functionality in a package that fits in one's pocket. Advances in technology have allowed mobile computing devices with powerful processing capabilities to become smaller and smaller, thereby enabling the mobile computing devices to be housed within a wristwatch assembly. However, in order to provide wristwatch-sized mobile computing devices with wireless communication capabilities, such wristwatch-sized mobile computing devices must also include an antenna capable of receiving the radio frequency signals of wireless networks. As the mobile computing device is made smaller and smaller, especially within the wristwatch-sized mobile computing device, space within the device is increasingly in demand.

SUMMARY

The various embodiments include a compact antenna system that provides an antenna capable of transmitting and receiving (i.e., transceiving) radio signals configured on a flexible substrate material (i.e., user control interface button flex). In a wristwatch device, the user control interface button flex may be configured as a flexible substrate that supports buttons located on the wristwatch housing. For example, in many conventional wristwatch designs, buttons are disposed on the side of the wristwatch housing (i.e., side buttons). However, user control interface buttons may be disposed in any of a number of locations and configurations on a wristwatch. Reference may be made in the specification to a side button, but such side buttons are also user control buttons and are not limited to a side housing location or configuration. The user control interface buttons may provide for user interface input to a wristwatch device. In an embodiment, an antenna may be formed on a user control interface button flex between the wire traces used to couple the user control interface buttons to the printed circuit board. In order to prevent the jamming of the RF circuit or conversely interference in any of the device-control circuits that may be caused when current passes through the wire traces coupling the user control interface buttons to the printed circuit board, bypass capacitors, and an RF choke circuit, such as an inductor or an inductor-capacitor (LC) filter circuit, may be configured along each wire trace.

In another embodiment, the existing wire trace coupling a user control interface button to the printed circuit board may be configured to serve the dual purposes of: 1) coupling the user control interface button to the printed circuit board; and 2) operating as an antenna capable of transceiving wireless radio signals. In order to tune the existing wire trace having a length greater or less than desired to operate over a specified frequency bandwidth, an antenna matching circuit may be implemented such that the existing wire trace may operate as an antenna over a specified frequency bandwidth. In alternative embodiments, a multiband matching circuit may be implemented such that that the existing wire trace may operate as an antenna over a plurality of specified frequency bandwidths. In addition, in order to prevent the interference on the antenna that may be caused when current passes through the wire traces coupling the user control interface buttons to the printed circuit board, bypass capacitors, and an RF choke circuit, such as an inductor or an inductor-capacitor (LC) filter circuit, may be configured along each wire trace. In a further embodiment, a de-coupling capacitor may be included to prevent any DC (i.e., low frequency) signals intended to be sent over the wire trace to a device-control circuit from jamming the components of the RF circuit. In an additional embodiment, a de-coupling inductor may be included to prevent the existing length of the selected wired trace from varying and de-tuning the frequency bandwidth at which the wire trace operates as an antenna.

The various embodiments provide an antenna that requires minimal space but also provides performance characteristics proportional to its size. The embodiments efficiently utilize available "real estate" within mobile device wristwatch housings by positioning the antenna in previously underutilized areas of the housing. The embodiments re-purpose existing components and structures in a wristwatch mobile device such that the existing components and structures may serve multiple purposes, including the acting as an antenna.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
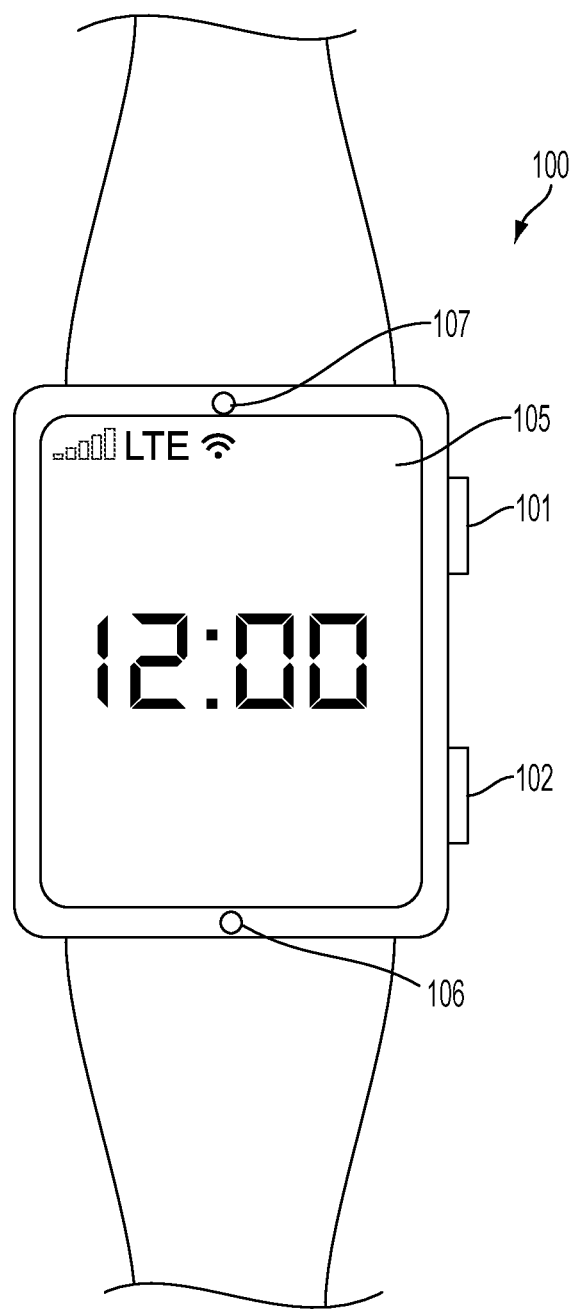
FIG. 1 is a top view of an embodiment wristwatch mobile computing device having user control interface buttons that provide user interface input capabilities.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or the claims. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments.

The word "approximately" as used herein with respect to certain dimensions means within ten percent of the dimension, including within five percent, within two percent and within one percent of the corresponding dimension.

As used herein, the terms "computing device" and "mobile computing device" refer to any one or all of cellular telephones, smart phones, personal data assistants (PDA's), palm-top computers, tablet computers, notebook computers, personal computers, wireless electronic mail receivers, multimedia Internet enabled cellular telephones, and similar electronic devices that include multiple programmable processors, and memory.

Improvements in computer design and fabrication technologies have allowed for the creation of powerful yet very mobile computing devices (e.g., smart phones) that users may carry with them on a daily basis. Indeed, the smart phones that many people carry in their pockets on a daily basis are more sophisticated and powerful than desktop computing devices of just a few years ago. Improvements in the fabrication and packaging of integrated circuits have led to the development of sophisticated and powerful mobile computing devices of small enough size to be worn as a wristwatch, which are referred to herein as wristwatch mobile computing devices.

As wireless communication capabilities are core to most mobile computing devices, a wristwatch mobile computing device will need to have similar capabilities in order to succeed in the marketplace. Therefore, it is desirable to configure a wristwatch computing device to communicate via a variety of wireless communications networks, such as Wireless Wide Area Network (WWAN), CDMA, TDMA, 3G, 4G, LTE, UTMS, Wi-Fi, BLUETOOTH® (BT), ANT, and ZIGBEE® networks, as well as receive Global Positioning System (GPS) signals. However, the size constraints associated with wristwatch mobile computing devices makes it difficult to include an antenna configured for such wireless technologies without growing the overall size of the device.

The various embodiments provide an antenna suitable for inclusion within a wristwatch mobile computing device without increasing the overall size of the device. In an embodiment, an antenna may be disposed in a previously underutilized location on the side flex circuit board of a wristwatch mobile computing device that supports user input buttons. By utilizing the side flex circuit board supporting control buttons as an antenna, the embodiments make use of existing components within the wristwatch mobile computing device. The various embodiments may enable multiple antennas to be provided that may efficiently utilize space in a wristwatch mobile computing device while enabling the device to communicate via multiple wireless communication networks.

FIG. 1 is top view of an embodiment wristwatch mobile computing device 100. The wristwatch mobile computing device 100 (also referred to as a wireless device) may include a user interface display 105, a microphone 106, and audio speakers 107. In addition, a user input interface may be provided in the form of conventional user control interface buttons 101, 102. Such conventional user control interface buttons may enable users to actuate or control lights, alarms, and stopwatch features, as well as other device operations, such as answering or ending a telephone call, responding to user interface prompts, selecting display functions, etc.

Figure 2:
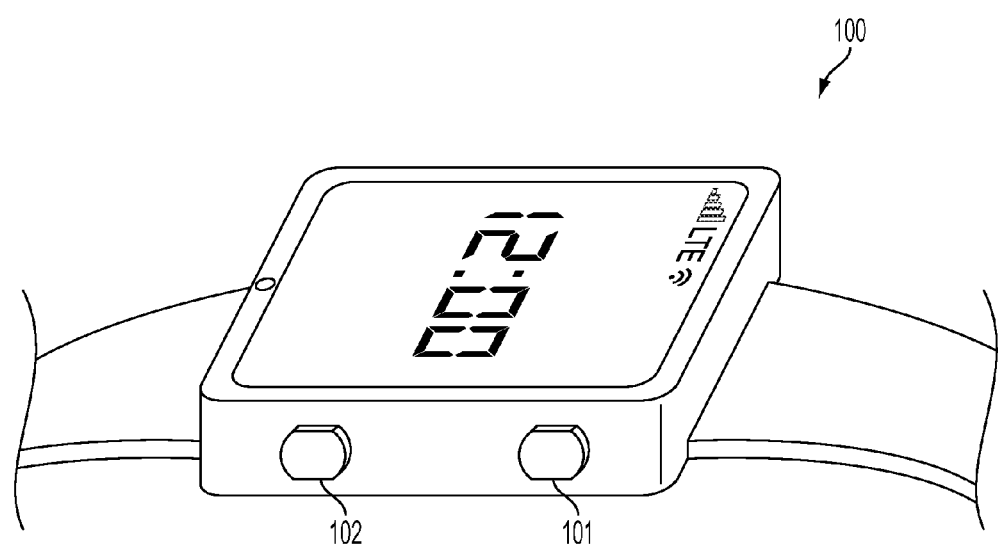
FIG. 2 is a perspective view of an embodiment wristwatch mobile computing device having user control interface buttons that provide user interface input capabilities.

FIG. 2 is a perspective view of the embodiment wristwatch mobile computing device 100 illustrated in FIG. 1 showing the user control interface buttons 101, 102. Due in large part to the size constraints of wristwatch mobile computing devices, user input interfaces have traditionally been limited to user control interface buttons. Improvements in touch-screen capabilities have improved user input interfaces to provide users with comprehensive input capabilities, such as touch screen displays. Nevertheless, user control interface buttons may still be utilized in wristwatch mobile computing devices.

Figure 3:
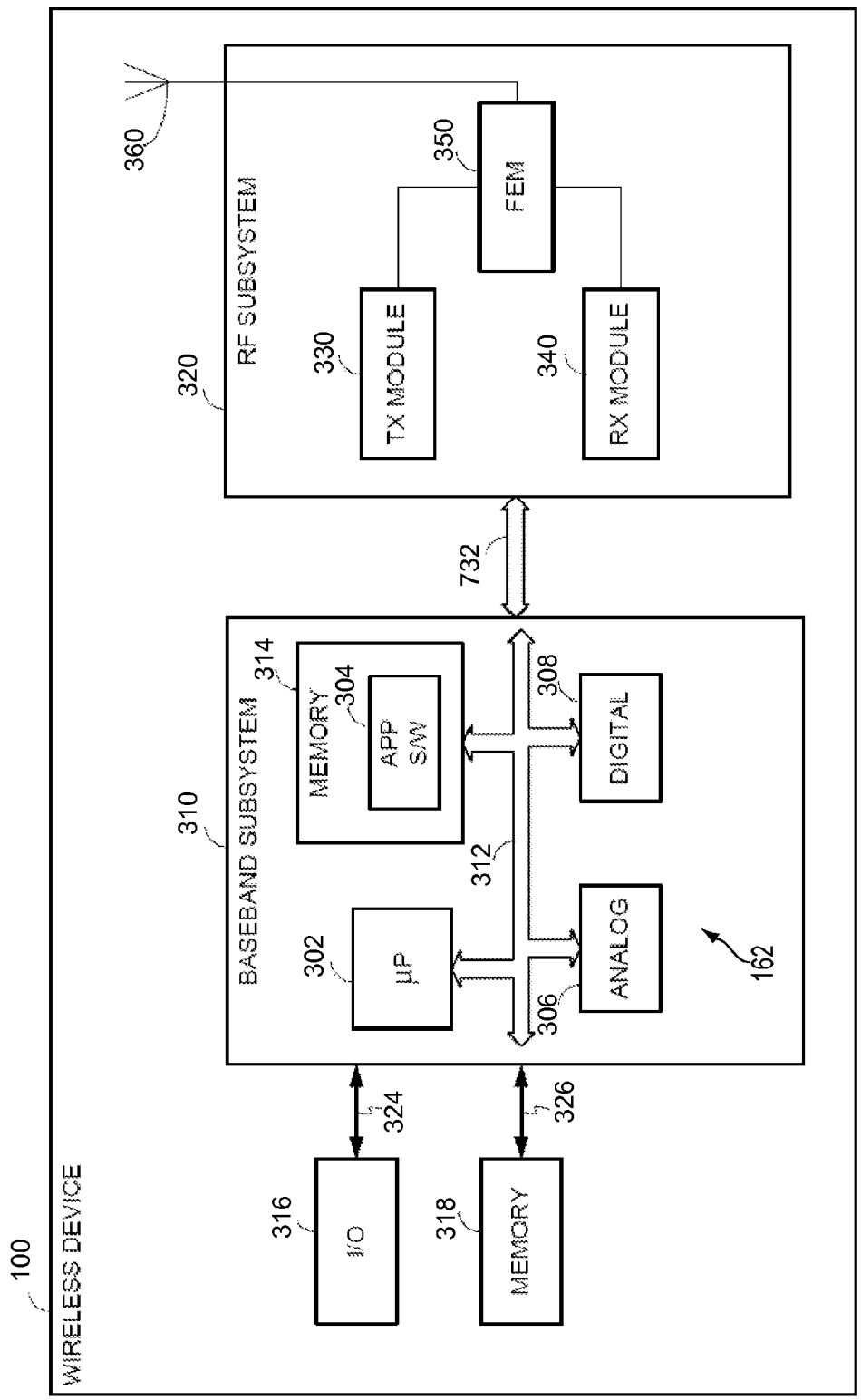
FIG. 3 is a block diagram illustrating the components and configuration of an embodiment mobile computing device with communication capabilities.

FIG. 3 is a block diagram illustrating various components utilized in an embodiment mobile computing device 100 with wireless communication capabilities. Referring to FIG. 3, a mobile computing device 100 with wireless communication capabilities may include a RF subsystem 320 which provides the wireless communication capabilities. The RF subsystem 320 may include an antenna 360 coupled to a front end module (FEM 350). The FEM 350 may modulate signals as they are transmitted and received to and from the antenna 360. Signals received at the antenna 360 may be downconverted by the FEM 350 and passed on to the receiving module 340. Similarly, signals may be received from the transmission module 330 for transmission out from the mobile device 100. The transmitted signals may be up-converted to their appropriate transmission frequency. The RF subsystem 320 may be coupled to the baseband subsystem 310 via RF susbsystem coupling 732. Signals for transmission out and received signals for further processing may be exchanged between the baseband subsystem 310 and RF subsystem via the RF subsystem coupling 732.

The base band subsystem 310 may include a plurality of processing and implementation circuits 162. These circuits 162 may include microprocessor 302 circuits, a memory unit 314 circuit storing a plurality of software applications and/or data 304, digital circuits 308 and analog circuits 306. Each of these circuits may be intercoupled via a data bus 312. The baseband susbsystem 310 typically exchanges signals at baseband (i.e., low frequency DC signals). The baseband subsystem 310 may be coupled to other components such as an input/output (I/O) interface 316. Such I/O interfaces 316 may include a keypad (virtual and/or hardwire). In smaller wristwatch sized embodiment devices the I/O interface 316 may include user control interface buttons 101, 102 disposed on a user control interface button flexible substrate material 113. The I/O interfaces 316 may be coupled to the baseband subsystem 310 via coupling 324. In addition, the baseband subsystem 310 may be coupled to an external memory unit 318. The external memory unit 318 may be coupled to the baseband subsystem 310 via coupling 326.

Figure 4:
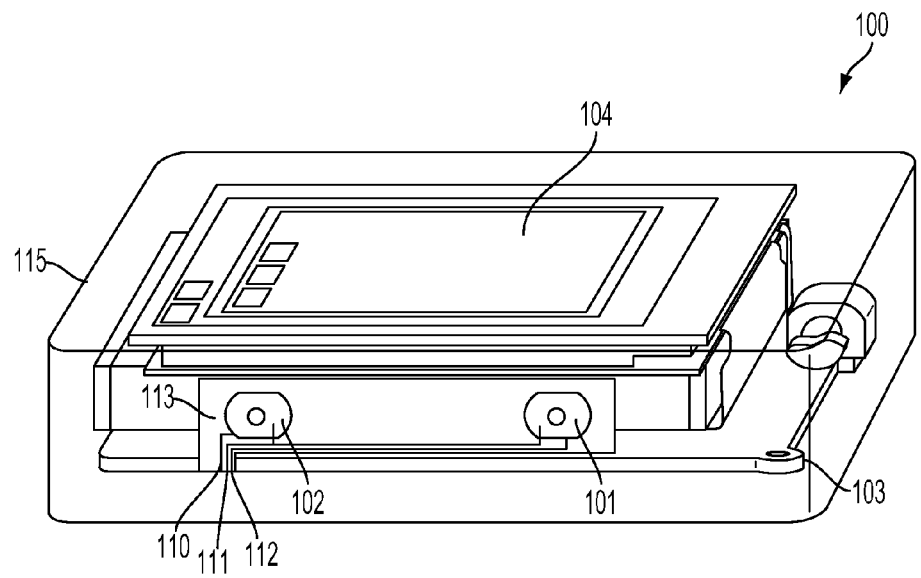
FIG. 4 is a perspective cut-away view of an embodiment wristwatch mobile computing device illustrating some of the internal components.

FIG. 4 is a perspective cut-away view showing some of the internal components of an embodiment wristwatch mobile computing device 100. As discussed above with respect to FIG. 1, the wristwatch mobile computing device 100 may include a wristwatch housing 115 that contains the user interface display 105, a microphone 106, and audio speakers 107. As further illustrated in FIG. 4, the wristwatch mobile computing device 100 may include a printed circuit board 103 will typically be used to support a device-control circuit 162 (i.e., one of the circuits found in the wristwatch mobile computing device 100), as well as other interfaces and circuit items that provide much of the device-control functionality of the wristwatch mobile computing device 100. Disposed along the side of the wristwatch housing 115 may be a flexible user control interface button substrate 113 that may support user control interface buttons 101, 102. The flexible user control interface button substrate 113, which is referred to herein as a user control interface button flex, may be formed of a flexible laminate material. The flexible user control interface button substrate 113 may be flexible to absorb the motion of user control interface buttons 101, 102 as they are depressed, yet rigid enough to support the user control interface buttons 101, 102 and retain the user control interface buttons 101, 102 in their positions within the wristwatch housing 115. While the embodiment illustrated in FIG. 4 (and in following FIGS. 5-8) depict two user control interface buttons 101, 102, various embodiments may be configured with fewer (i.e., a single user control interface button) or more user control interface buttons (e.g., three user control interface buttons, four user control interface buttons, etc.).

The flexible user control interface button substrate 113 may also support the wire traces 110, 111, 112 that couple the user control interface buttons 101, 102 to a device-control circuit 162 (i.e., one of the circuits found in the wristwatch mobile computing device 100) on the printed circuit board 103. In an embodiment, the device-control circuit 162 may include device-control high voltage connections and device-control ground voltage connections to which the wire traces 110, 111, and 112 may be connected. In this manner, the device-control circuit 162 may provide both a device-control circuit connection to the wire traces 110, 111, and 112, and a device-control ground connection to the wire traces 110, 111, and 112. In an embodiment, a device-control ground may be included on the printed circuit board 103 that is independent of the device-control circuit 162. Each of the user control interface buttons 101, 102 may operate as a switch. Each user control interface button 101, 102 switch may be coupled on one side to a high voltage level and on the other side to a ground voltage level so that a closing of a user control interface button 101, 102 switch completes a circuit that allows current to flow through the completed circuit. For example, FIG. 4 shows one user control interface button 101 coupled to two wire traces 112 and 111. One wire trace 112 may be coupled to a high voltage level, while the other wire trace 111 may couple the user control interface button 101 to a ground voltage level. Similarly, the other user control interface button 102 may be coupled to two wire traces 110 and 111. One wire trace 110 may be coupled to a high voltage level, while the other wire trace 111 may couple the user control interface button 102 to a ground voltage level. Since one wire trace 111 is coupled to ground in both instances, that wire trace 111 may be shared by both user control interface buttons 101 and 102.

Figure 5:
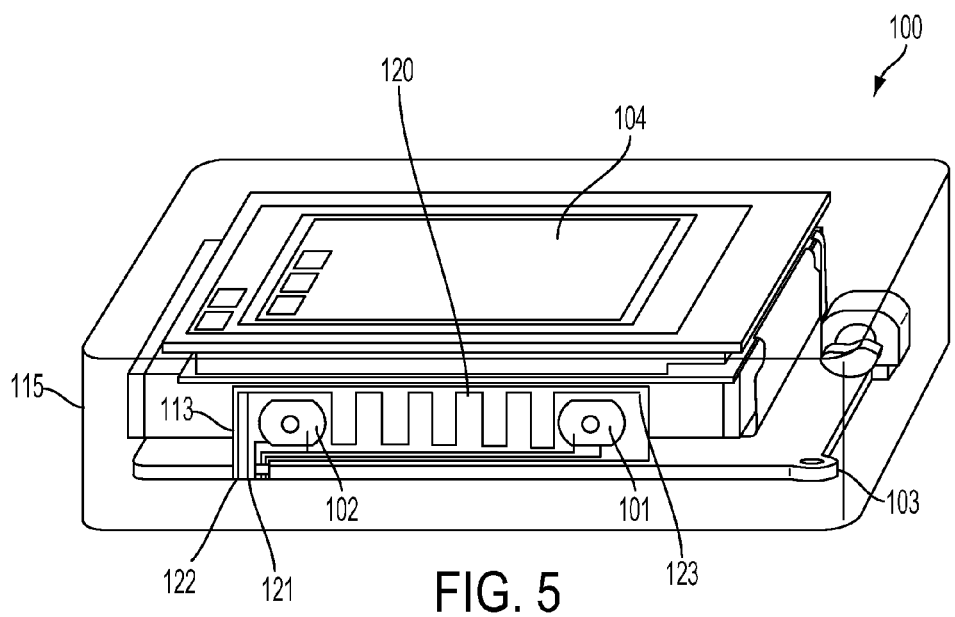
FIG. 5 is a perspective cut-away view of an embodiment wristwatch mobile computing device illustrating an antenna trace configured in the underutilized space between user control interface buttons on the user control interface button flex.

FIG. 5 is a perspective cut-away view of embodiment wristwatch mobile computing device 100 illustrating an antenna 120 disposed on the flexible user control interface button substrate 113. As shown in FIG. 4, in some wristwatch mobile computing device designs the space between user control interface buttons 101, 102 on the flexible user control interface button substrate 113 may be underutilized, making it a good location to add an antenna without adding another component to the device. An antenna 120 may be formed as a wire trace in the underutilized space between user control interface buttons 101, 102 on the flexible user control interface button substrate 113. For good radio frequency reception, the length of this antenna 120 plus the antenna ground plane (i.e., the printed circuit board 103) should be at least one half wavelength of the RF signals being transmitted or received. Thus, the length of the antenna 120 may be selected based on the frequency band of the wireless network over which the wristwatch mobile computing device 100 may transmit/receive (i.e., transceive) radio signals. As examples, the antenna 120 length may be configured to transceiver radio signals within a frequency band of 824 MHz to 960 MHz (i.e., cellular bands), 1565 MHz to 1610 MHz (i.e., GPS bands), 1710 MHz to 2170 MHz (i.e., DCS/PCS/IMT bands), 2400 MHz to 2500 MHz (i.e., Personal Area Networks such as Bluetooth® bands), or 698 MHz-798 MHz (i.e., LTE bands). These exemplary frequency bands are merely illustrative. One of skill in the art would recognize that the embodiment antennas may be configured to transceiver radio signals across the entire radio frequency spectrum used for personal communications. Thus, in order to achieve the desired length of the antenna 120, the wire trace may be formed of several folded paths or windings as shown in FIG. 5. In an embodiment, the antenna 120 may be a Wire Inverted F Antenna (WIFA) type antenna with a feed contact 121 and a ground contact 122. In a preferred embodiment, the distance between the feed contact 121 and ground contact 122 may be about 2 mm. The height of the feed contact 121 and ground contact may be about 8 mm, such that the antenna arm 123 is disposed on the flexible user control interface button substrate 113 approximately 8 mm away from the printed circuit board 103. In the preferred embodiment, the antenna arm 123 may be about 30 mm in total length in accordance with the desired operating frequency band and the overall size of the printed circuit board 103 operating as a ground plane.

Because the antenna 120 may be formed in such close proximity to other components such as the user control interface buttons 101, 102, these components may be unintentionally interact with the electromagnetic field generated by the antenna 120 radiations. Such unintentional interactions may generate high frequency currents that may be detrimental to the sensitive device-control processor circuit 162 to which the user control interface buttons 101, 102 provide input signals. In order to prevent the unintended wireless coupling effects from negatively impacting the operation of the device-control circuit 162, various choke and/or bypass capacitor circuits may be implemented. In the other words, the current that flows in the other components could also degrade the performance of antenna. As a result, it is desirable to decouple these other components from the antenna.

Figure 6:
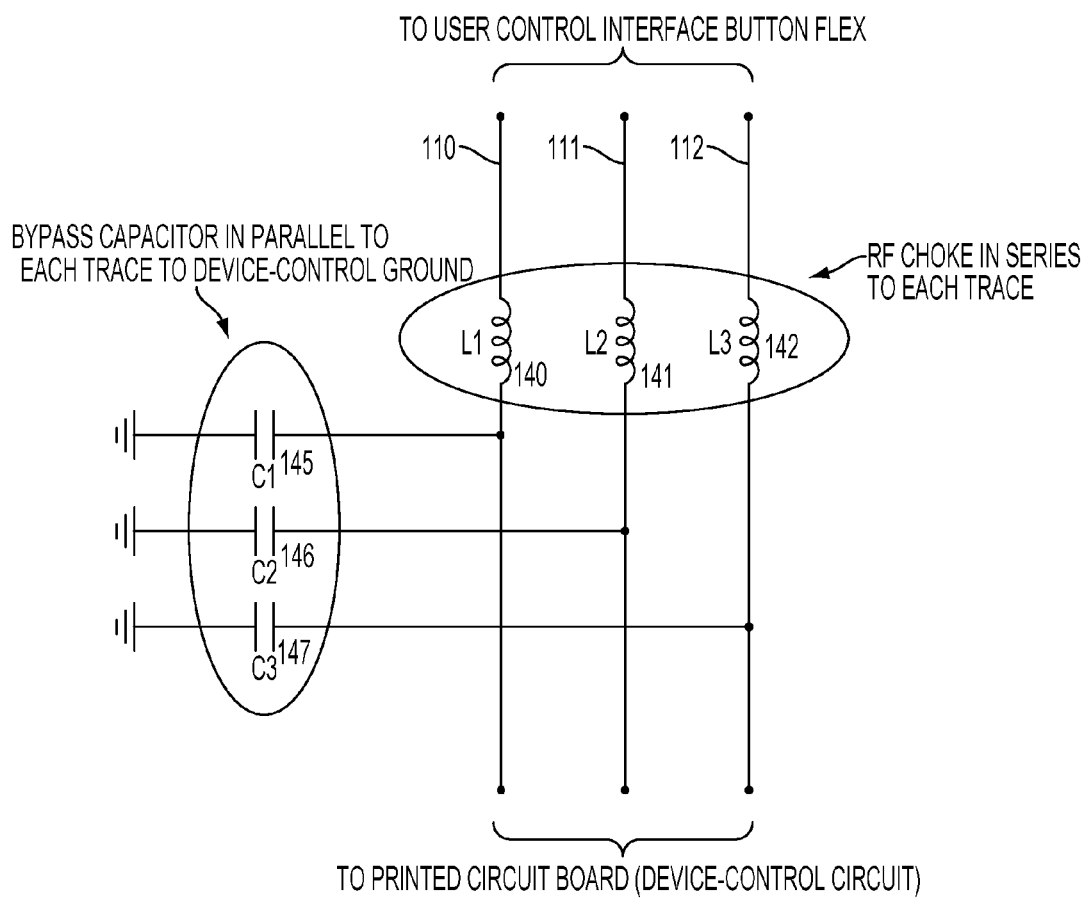
FIG. 6 is a circuit diagram illustrating the components and configuration of an embodiment RF choke circuit and bypass capacitor circuit.

FIG. 6 is a circuit diagram illustrating the components and configuration of an embodiment RF choke circuit and bypass capacitor circuit. The RF choke circuits illustrated in FIG. 6 may be employed to effectively block any imparted high frequency input signal along the wire traces 110, 111, 112 from being transmitted to the device-control circuit 162. An RF choke circuit may be disposed along each wire trace 110, 111, and 112 in series. The RF choke circuit may include an inductor. In FIG. 6 the RF chokes are illustrated as including inductors 140, 141, 142 disposed in series along each of wire traces 110, 111, and 112, respectively. The impedance of the inductors 140, 141, and 142 when operating at high frequency is effectively infinite. In other words, at high frequency, the RF choke circuit effectively behaves as an open circuit switch. As a result, the use of such a choke circuit may result in no current from the high frequency RF signal on the antenna 120 being transmitted to the device-control circuit 162 along wire traces 110, 111, and 112.

In an alternative embodiment, the RF choke circuit may be an inductor and a capacitor coupled in parallel, which is also referred to herein as an LC filter circuit. The value of the inductance (L) and the capacitance (C) of the LC filter circuit may be calculated by the formula:

$$F = \frac{1}{2\pi\sqrt{LC}},$$

where F is the resonant frequency, L is the value of inductance, and C is capacitance.

To further mitigate unintended antenna coupling effects, a bypassing capacitor 145, 146, 147 may be disposed in parallel with each wire trace 110, 111, 112 and coupled to a device-control ground as shown in FIG. 6. Since the impedance of a capacitor at high frequency effectively goes to zero, when a high frequency RF signal is coupled to each wire trace 110, 111, 112, the bypassing capacitor 145, 146, 147 acts as an effective short to ground. In this manner, any high frequency RF signal induced on any of the wire traces 110, 111, and 112 may be either shorted to ground via the bypassing capacitor 145, 146, 147 or blocked from further transmission to the device-control circuit 162 via each inductor 140, 141, 142 acting as an infinite impedance block to high frequency RF signals.

In an embodiment, the RF choke circuits (e.g., inductors 140, 141, 142 alone or inductors 140, 141, 142 connected in parallel with the bypass capacitors 145, 146, 147) may be disposed on the flexible user control interface button substrate 113. In another embodiment, the RF choke circuits (e.g., inductors 140, 141, 142 alone or inductors 140, 141, 142 connected in parallel with the bypass capacitors 145, 146, 147) may be disposed on the printed circuit board 103.

Because the flexible user control interface button substrate 113 may support the antenna 120, both the inductors 140, 141, 142 and the bypass capacitors 145, 146, 147 may be disposed on the printed circuit board 103 so that the mitigating effects achieved by the RF choke circuits (e.g., inductors 140, 141, 142 and the bypass capacitors 145, 146, 147) also mitigate effects caused by currents carried by the wire traces 110, 111, and 112, as well as the flexible user control interface button substrate 113. It may be preferred to dispose the inductors 140, 141, 142 and the bypass capacitors 145, 146, 147 and RF choke circuits on the printed circuit board 103 as opposed to the flexible user control interface button substrate 113 given the size constraints of the flexible user control interface button substrate 113. In addition, due its flexible nature, components disposed on the flexible user control interface button substrate 113 are more prone to movement and possible damage. By disposing these components on the rigid printed circuit board 103, many of these disadvantages may be avoided.

Since the antenna 120 is disposed as its own element on the flexible user control interface button substrate 113, it is possible that no coupling effects are imparted onto the wire traces 110, 111, and 112 and/or the flexible user control interface button substrate 113. Thus, in alternative embodiments the antenna 120 may be disposed on the flexible user control interface button substrate 113 without either the corresponding RF choke circuits (e.g., inductors 140, 141, 142 alone or inductors 140, 141, 142 connected in parallel with a capacitor to form a LC circuit) and/or the bypass capacitors 145, 146, 147. In the embodiments illustrated in FIGS. 4 and 5, a device 100 is shown with a first and second user control interface button 101, 102 disposed on the user control interface button flexible substrate 113. One of skill in the art would recognize that additional user control interface buttons may be disposed on the user control interface button flexible substrate 113 in a manner similar to illustrated user control interface buttons 101, 102. In alternative embodiments, the antenna arm 123 may be disposed in the unused space disposed between any of the plurality of user control interface buttons.

Figure 7:
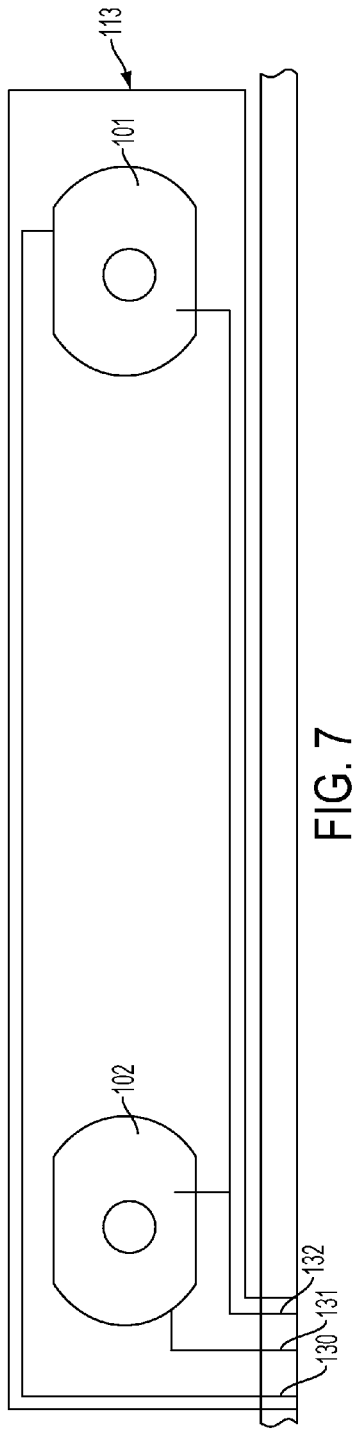
FIG. 7 is a close up view of another embodiment wristwatch mobile computing device illustrating the user control interface buttons, user control interface button flex and wire traces used to couple the user control interface buttons to a device-control circuit.

FIG. 7 is a close up view of another embodiment flexible user control interface button substrate 113 illustrating the user control interface buttons 101, 102 and wire traces 130, 131, and 132 used to couple the user control interface buttons 101, 102 to the device-control circuit 162. In the alternative embodiment shown in FIG. 7 one of the existing wire trace 130, 131, or 132 may be re-purposed to also operate as an antenna, rather than forming a separate antenna in the underutilized portion of the flexible user control interface button substrate 113. Thus, an existing wire trace 130, 131, or 132 may be re-purposed to also operate as an antenna. Such a dual-purpose trace 130, 131, or 132 may serve as a wire trace that conducts a device-control signal to at least one of the circuits found in the baseband subsystem 310 when a user control interface button 101 or 102 is depressed, and function as an antenna to transmit and/or receive RF signals. By re-purposing an existing electrical component within the wristwatch mobile computing device 100 in this manner, wireless communication capabilities may be provided without growing the overall size of the wristwatch computing device.

FIG. 7 shows two user control interface buttons 101 and 102 disposed on the flexible user control interface button substrate 113. Similar to the description provided above, a first wire trace 130 may provide a device-control high voltage to one side of a first switch (i.e., user control interface button 101), and a second wire trace 132 may provide a device-control ground voltage to the second side of the first switch (i.e., user control interface button 101). Thus, when the user control interface button 101 is depressed, the circuit is completed and a voltage input signal may be conducted to at least one of the circuits found in the baseband subsystem 310 through the first and second wire traces 130, 132. In a similar manner, a third wire trace 131 may provide a device-control high voltage to one side of the second switch (i.e., user control interface button 102), and a second wire trace 132 may provide a device-control ground voltage to the second side of the second switch (i.e., user control interface button 102). Since, the second wire trace 132 is used to conduct the common device-control ground voltage level, it is the same electrical node and may be used to conduct the device-control ground for both user control interface buttons 101 and 102. Thus, when the second user control interface button 102 is depressed, the circuit is completed and a voltage input signal may be conducted to the device-control processor circuit.

Figure 8:
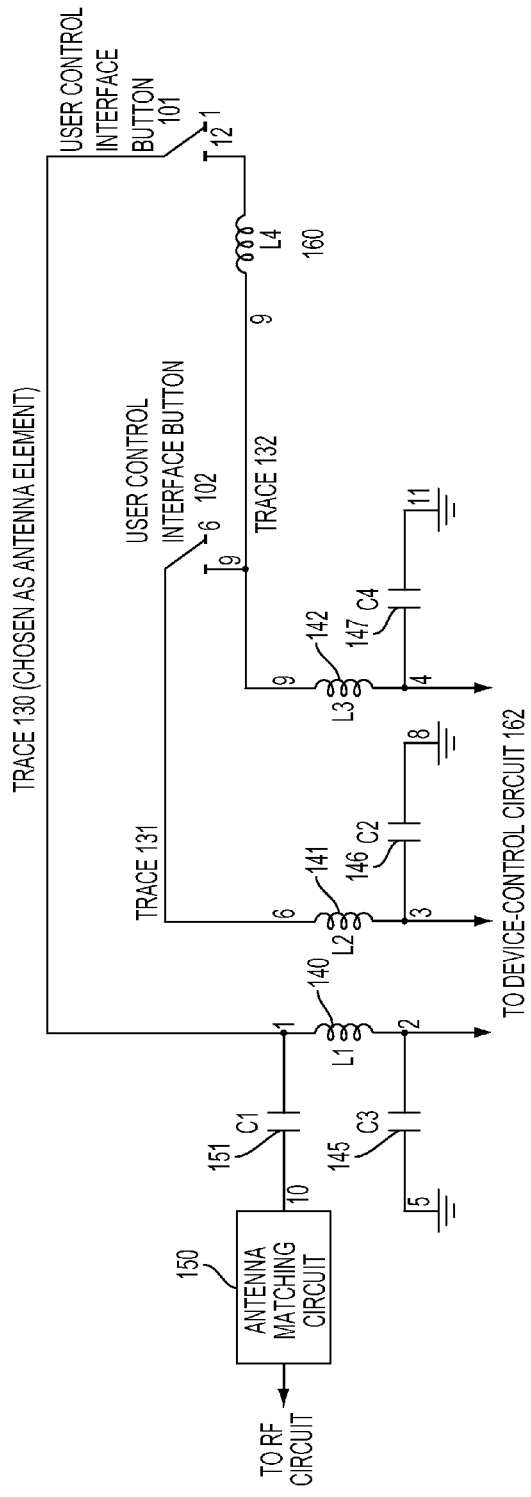
FIG. 8 is a circuit diagram of an alternative embodiment that re-purposes an existing wire trace to operate as an antenna.

In the embodiment illustrated in FIG. 7, either of the first and second wire traces 130 or 131 may be selected to function as an antenna. The first wire trace 130 is disposed further away from second wire trace 132 that is conducting the ground voltage than is the third wire trace 131. So, the first wire trace 130 may be used as the antenna. FIG. 8 is a circuit diagram illustrating the components shown in FIG. 7 and showing connections to the first wire trace 130 that enable it to function as an antenna.

Referring to both FIGS. 7 and 8, the first wire trace 130 may be selected to operate as an antenna for wireless communication capabilities. As previously noted, for good radio frequency reception, the length of an antenna plus the antenna ground plane (i.e., printed circuit board 103) should be at least one half wavelength of the RF signals being transmitted. In some instances, it may be possible to design the wristwatch mobile computing device such that the first wire trace 130 is formed to the desired length. The length of the wire trace 130 may be selected based on the frequency band of the network over which the wristwatch mobile computing device may transmit/receive (i.e., transceiver) radio signals. As examples, the wire trace 130 length may be configured to transceiver radio signals over a network having a frequency band of 698 MHz-798 MHz, 824 MHz to 960 MHz, 1565 MHz to 1610 MHz, 1710 MHz to 2170 MHz, or 2400 MHz to 2500 MHz. Depending upon the dimensions of the flexible user control interface button substrate 113 and the desired frequency band, the wire trace 130 may be formed as a straight trace as shown in FIGS. 7 and 8. If a longer antenna length is required for reception/transmission at the desired frequency band, the first wire trace 130 may be configured to include a number of switch back traces or windings in order to achieve the desired length within the dimensions of the flexible user control interface button substrate 113. In some embodiments, the length of the first wire trace 130 may be pre-defined due to other limitations of the device. Therefore, in order to enable a wire trace of the pre-defined length to transmit and receive RF signals across a specified frequency band, an antenna matching circuit module 150 may be disposed between the wire trace 130 and an RF circuit (i.e., radio). The antenna matching circuit module 150 may compensate for any discrepancy in the length of the first wire trace 130 compared to the desired antenna length for a particular frequency band. The antenna matching circuit module 150 may include a single band antenna matching circuit such that when coupled to the first wire trace 130, the first wire trace 130 may transceiver radio signals over specified frequency bands. In alternative embodiments the antenna matching circuit module 150 may include a multiband antenna matching circuit such that when coupled to the first wire trace 130, the first wire trace 130 may transceiver radio signals over a plurality of specified frequency bands. For sake of simplicity, the embodiments are disclosed herein as implementing an antenna matching circuit module 150 containing a single band antenna matching circuit. One of skill in the art would recognize that the antenna matching circuit module 150 may contain a multiband matching circuit, which would allow the wire trace to transceiver signals across a plurality of specified frequency bands.

Since wire trace 130 may conduct high frequency RF signals when wire trace 130 operates as an antenna and low frequency (direct current) device-control input signals from user control interface button 101 when operating as a wire trace to one of the circuits found in the wristwatch mobile computing device 100, it may be necessary to prevent the low frequency device-control signals from being conducted to the RF circuit and high frequency RF signals from being conducted to at least one of the circuits found in the wristwatch mobile computing device 100. In order to prevent such undesired signal and current flows, a decoupling capacitor 151 may be used to connect the wire trace 130 to the antenna matching circuit 150. As previously discussed, when a high frequency signal appears across a capacitor, the capacitor effectively acts as a short circuit. Thus, when the first wire trace 130 conducts a high frequency RF signal when functioning as an antenna, the decoupling capacitor 151 may effectively conduct the high frequency RF signal to the antenna matching circuit module 150 as if the decoupling capacitor 151 were a direct short to the antenna matching circuit 150. In contrast, when a low frequency signal (e.g., a DC signal) appears across a capacitor, the capacitor effectively acts as a high impedance element blocking the current from passing through the capacitor. Thus, when the first wire trace 130 is functioning to conduct a low frequency (DC) input signal from a user control interface button 101 to the device-control processing circuit 162, the decoupling capacitor 151 effectively blocks the DC signal from jamming the RF circuit, thereby effectively decoupling the RF circuit from the low frequency input signal.

In contrast to the embodiment shown in FIG. 5 where the only manner in which a high frequency RF signal may conduct on the wire traces 110, 111, 112 is due to antenna coupling between the antenna 120 and the RF signal onto wire traces 110, 111, 112, the embodiment shown in FIGS. 7 and 8 re-purposes the first wire trace 130 to conduct both the high frequency RF signal and the low frequency DC signal for the device-control circuit 162. Therefore, either of the RF choke circuits (e.g., inductors, bypassing capacitors, or both inductors and bypassing capacitors) may be necessary to prevent the high frequency RF signal from being conducted to at least one of the circuits found in the wristwatch mobile computing device 100. As discussed above with respect to the embodiments shown in FIG. 6, an RF choke circuit may be employed to effectively block any high frequency input signal along the wire traces 130, 131, 132 from being transmitted to the device-control circuit 162. An RF choke circuit may be disposed along each wire trace 130, 131, 132 in series. In an embodiment, an RF choke circuit may consist of an inductor 140, 141, 142. The inductors 140, 141, 142 may be disposed in series along each of the user control interface button wire traces 130, 131, 132. Because the impedance of the inductor 140 operating at high frequency has an effective infinite impedance, no current resulting from a high frequency RF signal being conducted on the first wire trace 130 may be transmitted to the device-control circuit 162. In addition, by disposing inductors 141 and 142 along the other wire traces 131 and 132, any high frequency RF signal that may be wirelessly coupled onto those traces 131 or 132 may also be choked from being conducted to the device-control processor circuit 162.

Also, in a manner similar to that discussed above with reference to FIG. 6, FIG. 8 illustrates that in an embodiment bypassing capacitors 145, 146, 147 may also be disposed in parallel with each of the wire traces 130, 131, 132 connecting the wire traces 130, 131, 132 to device-control ground. Since the impedance of a capacitor at high frequency effectively goes to zero, when a high frequency RF signal is coupled onto each of the wire traces 130, 131, 132, the bypassing capacitor 145, 146, 147 acts as an effective short to ground. In this manner, any high frequency RF signal coupled onto any of the wire traces 130, 131, 132 is either shorted to ground via the bypassing capacitors 145, 146, 147 or blocked from further transmission to the device-control circuit 162 via each inductor 140, 141, 142 acting as an infinite impedance block. As discussed above, the inductors 140, 141, 142 and the bypass capacitors 145, 146, 147 may be disposed on the printed circuit board 103 so that the mitigating effects achieved by the RF choke circuits (e.g., inductors 140, 141, 142 or inductors 140, 141, 142 in parallel with a respective capacitor to form a LC circuit) and the bypass capacitors 145, 146, 147 also mitigate effects caused by currents carried by the wire traces 130, 131, 132 as well as the flexible user control interface button substrate 113.

Typically, a static antenna length is desired because a constantly varying length of antenna may be difficult to consistently transmit and/or receive signals of a specified frequency bandwidth. While an antenna matching circuit module 150 may help adjust the transmission and reception characteristics of an antenna that is not of the ideal length, an antenna matching circuit module 150 may require the antenna to remain static in length. In the embodiment shown in FIG. 8, the first wire trace 130 is coupled to a first side of first user control interface button 101, while the second wire trace 132 may couple the second side of the first button 101 to ground. When the first button 101 is depressed and the circuit is complete, the effective length of the first wire trace 130 is increased by the length of the second wire trace 132. As a result, the transmission and reception characteristics of the first wire trace 130 functioning as an antenna are altered. The first wire trace 130 may no longer be able to properly transmit or receive RF signals within the desired frequency band.

By disposing the decoupling inductor 160 immediately on the second side (e.g., the second wire trace 132 side) of the first button 101, the length of the first wire trace 130 functioning as an antenna may be preserved. When the first user control interface button 101 is not depressed, the length of the first wire trace 130 is static and known. When the first user control interface button 101 is depressed and the circuit completed connection the first wire trace 130 and the second wire trace 132, the decoupling inductor 160 effectively cuts off (i.e., decouples) the second wire trace 132 from RF signals because the impedance of the inductor 160 is high at the high frequency of the RF signals. Thus, the effective length of the first wire trace 130 functioning as the antenna remains static and known. Thus, the first wire trace 130 may properly transmit and receive RF signals in the desired frequency band even when the user control interface button 101 is depressed. The decoupling inductor 160 permits the low frequency/DC signal to flow and thus enables the button press to complete the circuit to ground at least one of the circuits found in the wristwatch mobile computing device 100.

By providing a capacitor 151 coupled between a wire trace 130 and a RF circuit, an inductor 160 immediately on the second side of a first user control interface button, and the RF choke circuits (e.g., inductors 140, 141, 142 and/or bypassing capacitors 145, 146, 147), a conventional user control interface button wire trace 130 may be re-purposed to also operate as an antenna for a wristwatch mobile computing device. In addition, an optional antenna matching circuit module 150 may enable a wire trace 130 that was not of a specified length to transceive RF signals over a desired frequency bandwidth.

Figure 9:
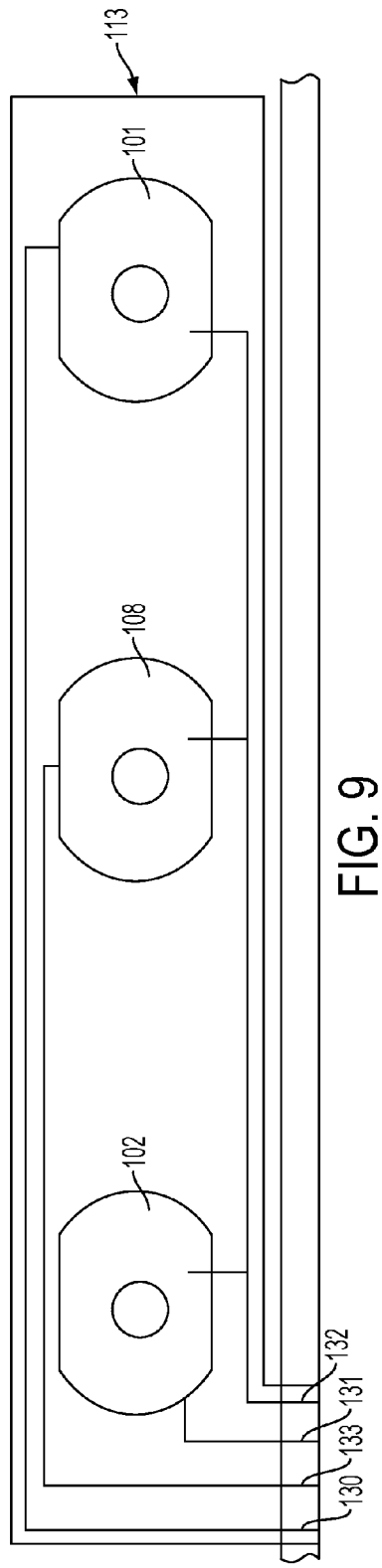
FIG. 9 is a close up view of another embodiment wristwatch mobile computing device illustrating a plurality of user control interface buttons, user control interface button flex and wire traces used to couple the plurality of user control interface buttons to a device-control circuit.

The embodiments described above have one or two user control interface buttons 101, 102. However, such wristwatch-sized computing devices may include any number of user control interface buttons for providing user input interface options. FIG. 9 illustrates an embodiment in which a plurality of user control interface buttons 101, 102, 108 are disposed on the flexible user control interface button substrate 113. In FIG. 9, wire traces 130, 131, 132 and 133 may be used to couple the user control interface buttons 101, 102, 108 to the device-control circuit 162. Similar to the embodiment described above with reference to FIG. 7, in the alternative embodiment shown in FIG. 9, one of the wire traces 130, 131, 132 or 133 may be re-purposed to also operate as an antenna, rather than forming a separate antenna in the underutilized portion of the flexible user control interface button substrate 113. Such a dual-purpose trace 130, 131, 132 or 133 may serve as a wire trace that conducts a device-control signal to at least one of the circuits found in the wristwatch mobile computing device 100 when a user control interface button 101, 102, 108 is depressed, and function as an antenna to transmit and/or receive RF signals. By re-purposing an existing electrical component within the wristwatch mobile computing device 100 in this manner, wireless communication capabilities may be provided without growing the overall size of the wristwatch computing device. The alternative embodiment illustrated in FIG. 9 may require additional RF choke inductors 143 and bypassing capacitors 148.

Figure 10:
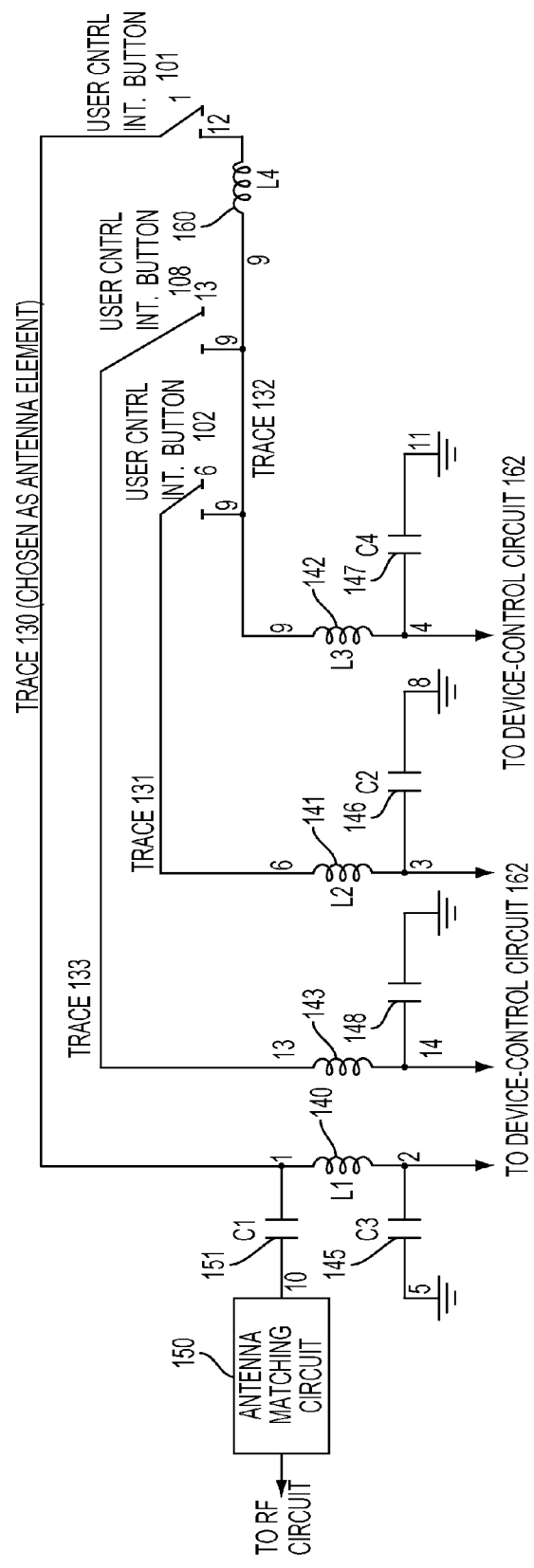
FIG. 10 is a circuit diagram of an alternative embodiment shown in FIG. 8 that re-purposes an existing wire trace to operate as an antenna.

FIG. 10 is a circuit diagram illustrating the components shown in FIG. 9 and showing connections to the first wire trace 130 that enable it to function as an antenna as well a button trace. These components include RF chokes 140, 141, 142, 143 and bypassing capacitors 145, 146, 147, and 148 coupled to each of the wire traces 130, 131, 132, and 133. One of skill in the art would recognize that more than three user control interface buttons may be disposed on the user control interface button flexible substrate with at least one of the button traces serving the additional function as an antenna by implementing circuit elements similar to those illustrated in FIG. 10.

Figure 11:
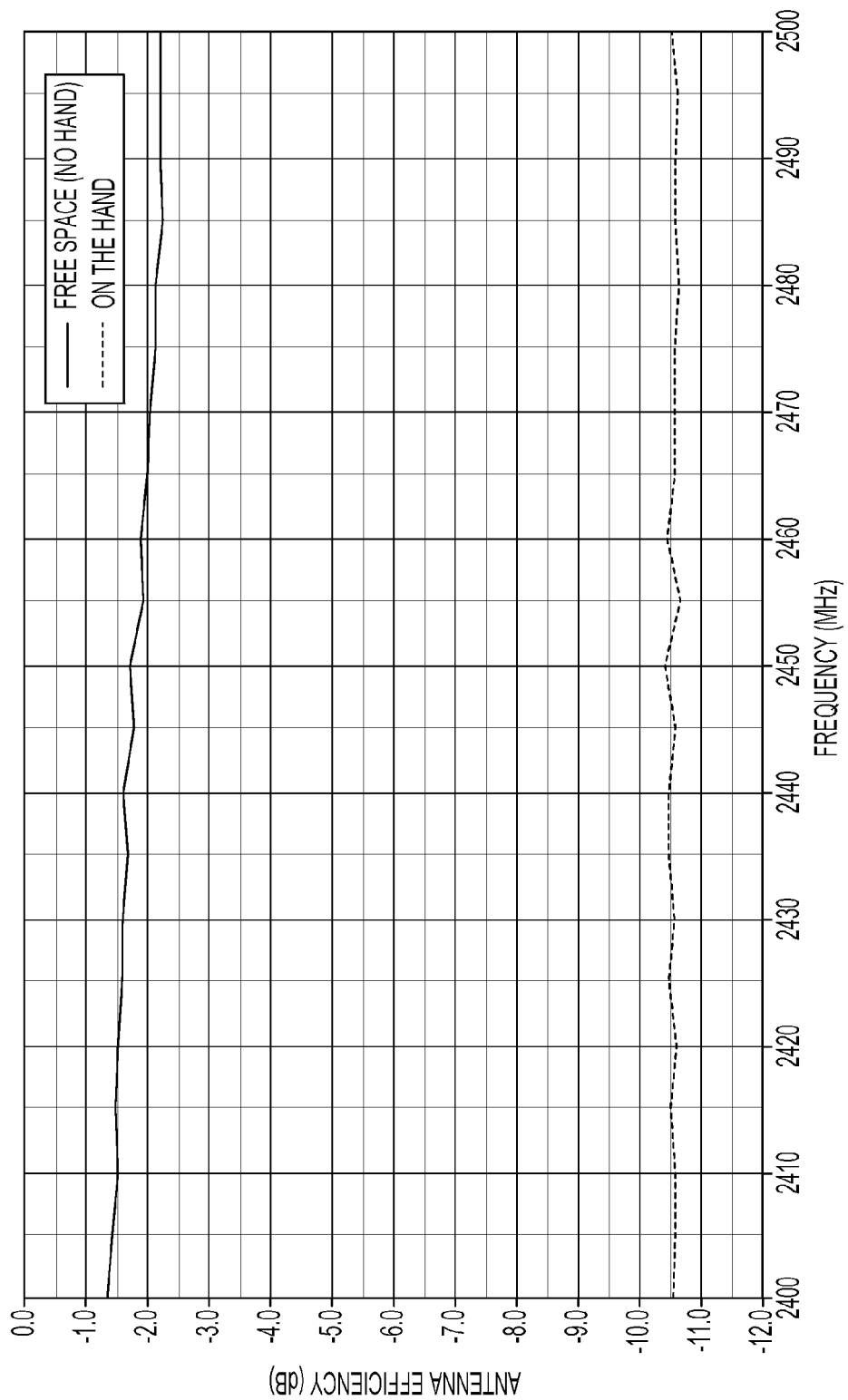
FIG. 11 is a graph of the simulation results of an embodiment wristwatch mobile computing device.

The performance of embodiment antenna designs have been confirmed by antenna measurement as illustrated in FIG. 11, which is a graph of the measured results of the various embodiment compact antenna systems shown in FIGS. 1-10. FIG. 11 plots the efficiency of the antenna as it operates in free space and as it operates when worn on the wrist of a user. One of ordinary skill in the art may recognize the measured results to be consistent with that a well designed antenna as the antenna efficiency is greater than −2.4 dB across the entire frequency band when operating in free space. While the efficiency of the antenna does degrade when the antenna device is worn on the wrist of a user, such degradation of efficiency is unavoidable as any antenna operating in such close proximity to the user's body may suffer similar degradation in efficiency that may not be avoided given the intended use of such antennas.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

What is claimed is:

1. A wristwatch mobile computing device, comprising:
   a wristwatch housing;
   a printed circuit board supporting at least one device-control circuit;
   a first user control interface button;
   a first wire trace coupling the first user control interface button to the at least one device-control circuit;
   a second wire trace coupling the first user control interface button to at least one device-control ground;
   a flexible user control interface button substrate having sufficient rigidity to support the first user control interface button and sufficient flexibility to absorb a depressing motion of the first user control interface button, wherein the flexible user control interface button substrate and the first user control interface button are disposed on a side of the wristwatch housing;
   a radio frequency (RF) circuit; and an antenna disposed on the flexible user control interface button substrate and coupled to the RF circuit.

2. The wristwatch mobile computing device of claim 1, further comprising:
a first RF choke circuit disposed on the printed circuit board in series between the first wire trace and the at least one device-control circuit; and
a second RF choke circuit disposed on the printed circuit board in series between the second wire trace and the at least one device-control circuit.

3. The wristwatch mobile computing device of claim 2, further comprising:
a second user control interface button;
a third wire trace coupling the second user control interface button to the at least one device-control circuit; and
a third RF choke circuit disposed on the printed circuit board in series between the third wire trace and the at least one device-control circuit,
wherein:
the second wire trace couples both the first user control interface button and the second user control interface button to the at least one device-control ground; and
the flexible user control interface button substrate is further configured to support the second user control interface button.

4. The wristwatch mobile computing device of claim 3, wherein at least one of the first, second, and third RF choke circuits comprises an inductor.

5. The wristwatch mobile computing device of claim 3, wherein at least one of the first, second and third RF choke circuits comprises an LC filter circuit.

6. The wristwatch mobile computing device of claim 3, wherein:
the first RF choke circuit comprises a first inductor disposed on the printed circuit board in series between the first wire trace and the at least one device-control circuit and a first bypass capacitor disposed on the printed circuit board in parallel between the first wire trace and the at least one device-control ground;
the second RF choke circuit comprises a second inductor disposed on the printed circuit board in series between the second wire trace and the at least one device-control circuit and a second bypass capacitor disposed on the printed circuit board in parallel between the second wire trace and the at least one device-control ground; and
the third RF choke circuit comprises a third inductor disposed on the printed circuit board in series between the third wire trace and the at least one device-control circuit and a third bypass capacitor disposed on the printed circuit board in parallel between the third wire trace and ground.

7. The wristwatch mobile computing device of claim 3, wherein the antenna is disposed on the flexible user control interface button substrate between the first user control interface button and the second user control interface button.

8. A wristwatch mobile computing device, comprising:
a wristwatch housing;
a printed circuit board supporting at least one device-control circuit;
a first user control interface button disposed on a flexible user control interface button substrate having sufficient rigidity to support the first user control interface button and sufficient flexibility to absorb a depressing motion of the first user control interface button, wherein the flexible user control interface button substrate and the first user control interface button are disposed on a side of the wristwatch housing;
a first wire trace coupling the first user control interface button to the at least one device-control circuit and an RF circuit, the first wire trace configured to operate as an antenna;
a second wire trace coupling the first user control interface button to at least one device-control ground;
a first RF choke circuit disposed on the printed circuit board in series between the first wire trace and the at least one device-control circuit; and
a second RF choke circuit disposed on the printed circuit board in series between the second wire trace and the at least one device-control circuit.

9. The wristwatch mobile computing device of claim 8, further comprising:
a second user control interface button disposed on the flexible user control interface button substrate;
a third wire trace coupling the second user control interface button to the at least one device-control circuit; and
a third RF choke circuit disposed on the printed circuit board in series between the third wire trace and the at least one device-control circuit,
wherein the second wire trace couples both the first user control interface button and the second user control interface button to the at least one device-control ground.

10. The wristwatch mobile computing device of claim 9, wherein at least one of the first, second, and third RF choke circuits comprises an inductor.

11. The wristwatch mobile computing device of claim 9, wherein at least one of the first, second and third RF choke circuits comprises an LC filter circuit.

12. The wristwatch mobile computing device of claim 9, wherein:
the first RF choke circuit comprises a first inductor disposed on the printed circuit board in series between the first wire trace and the at least one device-control circuit and a first bypass capacitor disposed on the printed circuit board in parallel between the first wire trace and the at least one device-control ground;
the second RF choke circuit comprises a second inductor disposed on the printed circuit board in series between the second wire trace and the at least one device-control circuit and a second bypass capacitor disposed on the printed circuit board in parallel between the second wire trace and the at least one device-control ground; and
the third RF choke circuit comprises a third inductor disposed on the printed circuit board in series between the third wire trace and the at least one device-control circuit and a third bypass capacitor disposed on the printed circuit board in parallel between the third wire trace and the at least one device-control ground.

13. The wristwatch mobile computing device of claim 12, further comprising an antenna matching circuit module coupled to the first wire trace.

14. The wristwatch mobile computing device of claim 13, further comprising a decoupling capacitor disposed in series between the first wire trace and the RF circuit.

15. The wristwatch mobile computing device of claim 13, further comprising a decoupling inductor disposed in series between the first user control interface button and the second inductor.

16. The wristwatch mobile computing device of claim 13, wherein the first wire trace is configured in length to transceive radio signals within a specified frequency band.

17. The wristwatch mobile computing device of claim 16, wherein the first wire trace is configured in length to transceive radio signals within the specified frequency band of 2400 MHz to 2500 MHz.

18. The wristwatch mobile computing device of claim 16, wherein the first wire trace is configured in length to transceive radio signals within the specified frequency band of 1565 MHz to 1610 MHz.

19. The wristwatch mobile computing device of claim 16, wherein the first wire trace is configured in length to transceive radio signals within the specified frequency band of 1710 MHz to 2170 MHz.

20. The wristwatch mobile computing device of claim 16, wherein the first wire trace is configured in length to transceive radio signals within the specified frequency band of 824 MHz to 960 MHz.

21. The wristwatch mobile computing device of claim 16, wherein the first wire trace is configured in length to transceive radio signals within the specified frequency band of 698 MHz to 798 MHz.

22. The wristwatch mobile computing device of claim 13, wherein the antenna matching circuit module comprises:
a multiband antenna matching circuit configured to allow the first wire trace to transceive radio signals over a plurality of specified frequency bands.

23. The wristwatch mobile computing device of claim 12, further comprising:
a third user control interface button disposed on the flexible user control interface button substrate;
a fourth wire trace configured to couple the third user control interface button to the at least one device-control circuit; and
a fourth RF choke circuit disposed on the flexible user control interface button substrate in series between the fourth wire trace and the at least one device-control circuit,
wherein the second wire trace couples the first user control interface button, the second user control interface button and the third user control interface button to the at least one device-control ground.

24. The wristwatch mobile computing device of claim 23, wherein:
the fourth RF choke circuit comprises a fourth inductor disposed on the printed circuit board in series between the fourth wire trace and the at least one device-control circuit and a fourth bypass capacitor disposed on the printed circuit board in parallel between the fourth wire trace and the at least one device-control ground.

25. An antenna suitable for implementation in a wristwatch device, comprising:
a first user control interface button disposed on a flexible user control interface button substrate having sufficient rigidity to support the first user control interface button and sufficient flexibility to absorb a depressing motion of the first user control interface button;
a first wire trace configured to couple the first user control interface button to at least one device-control circuit and an RF circuit;
a second wire trace configured to couple the first user control interface button to at least one device-control ground;
a first RF choke circuit disposed on the flexible user control interface button substrate in series between the first wire trace and the at least one device-control circuit; and
a second RF choke circuit disposed on the flexible user control interface button substrate in series between the second wire trace and the at least one device-control circuit.

26. The antenna of claim 25, further comprising:
a second user control interface button disposed on the flexible user control interface button substrate;
a third wire trace configured to couple the second user control interface button to the at least one device-control circuit; and
a third RF choke circuit disposed on the flexible user control interface button substrate in series between the third wire trace and the at least one device-control circuit,
wherein the second wire trace couples both the first user control interface button and the second user control interface button to the at least one device-control ground.

27. The antenna of claim 26, wherein at least one of the first, second, and third RF choke circuits comprises an inductor.

28. The antenna of claim 26, wherein at least one of the first, second and third RF choke circuits comprises an LC filter circuit.

29. The antenna of claim 26, further comprising an antenna matching circuit module coupled to the first wire trace.

30. The antenna of claim 29, further comprising a decoupling capacitor disposed in series between the first wire trace and the RF circuit.

31. The antenna of claim 29, further comprising a decoupling inductor disposed in series between the first user control interface button and the second RF choke circuit.

32. The antenna of claim 31, wherein the first wire trace is configured in length to transceive radio signals within a specified frequency band of 2400 MHz to 2500 MHz.

33. The antenna of claim 31, wherein the first wire trace is configured in length to transceive radio signals within a specified frequency band of 1565 MHz to 1610 MHz.

34. The antenna of claim 31, wherein the first wire trace is configured in length to transceive radio signals within a specified frequency band of 1710 MHz to 2170 MHz.

35. The antenna of claim 31, wherein the first wire trace is configured in length to transceive radio signals within a specified frequency band of 824 MHz to 960 MHz.

36. The antenna of claim 31, wherein the first wire trace is configured in length to transceive radio signals within a specified frequency band of 698 MHz to 798 MHz.

37. The antenna of claim 29, wherein the first wire trace is configured in length to transceive radio signals within a specified frequency band.

38. The antenna of claim 29, wherein the antenna matching circuit module comprises:
a multiband antenna matching circuit configured to allow the first wire trace to transceive radio signals over a plurality of specified frequency bands.

39. The antenna of claim 26, further comprising:
a third user control interface button disposed on the flexible user control interface button substrate;
a fourth wire trace configured to couple the third user control interface button to the at least one device-control circuit; and
a fourth RF choke circuit disposed on the flexible user control interface button substrate in series between the fourth wire trace and the at least one device-control circuit, wherein the second wire trace couples the first user control interface button, the second user control interface button and the third user control interface button to the at least one device-control ground.

40. The antenna of claim 39, wherein:

the fourth RF choke circuit comprises a fourth inductor disposed on a printed circuit board in series between the fourth wire trace and the at least one device-control circuit and a fourth bypass capacitor disposed on the printed circuit board in parallel between the fourth wire trace and the at least one device-control ground.

* * * * *